April 5, 1927. 1,623,037
G. A. ANDERSON
CAR TRUCK SIDE FRAME
Filed March 19, 1923  2 Sheets-Sheet 1
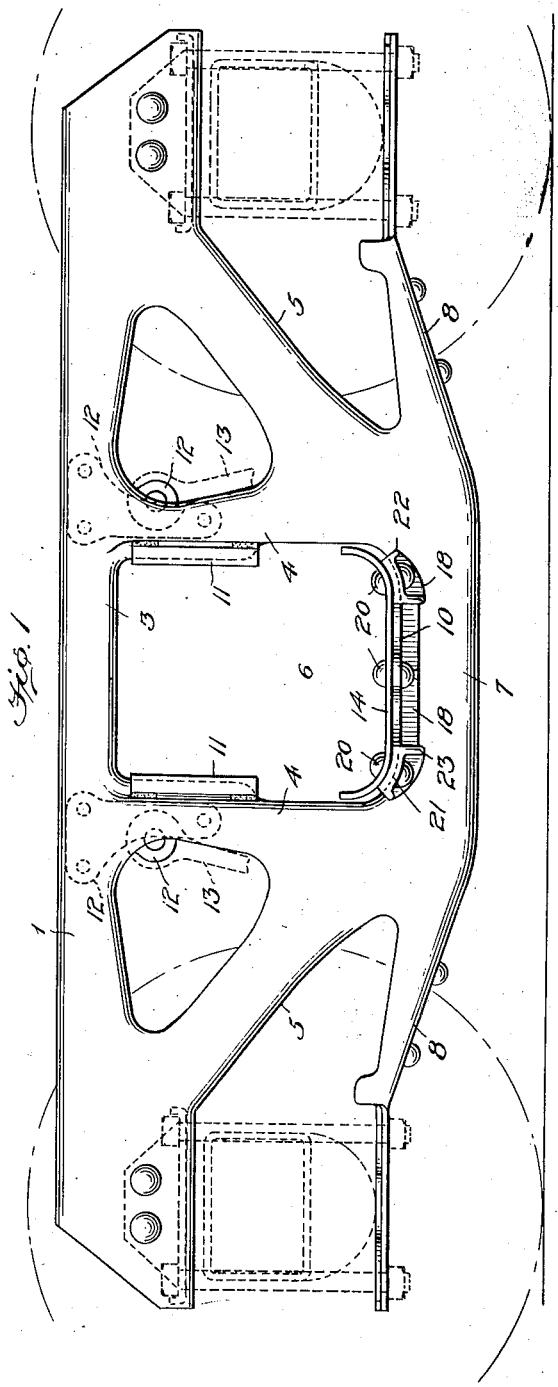
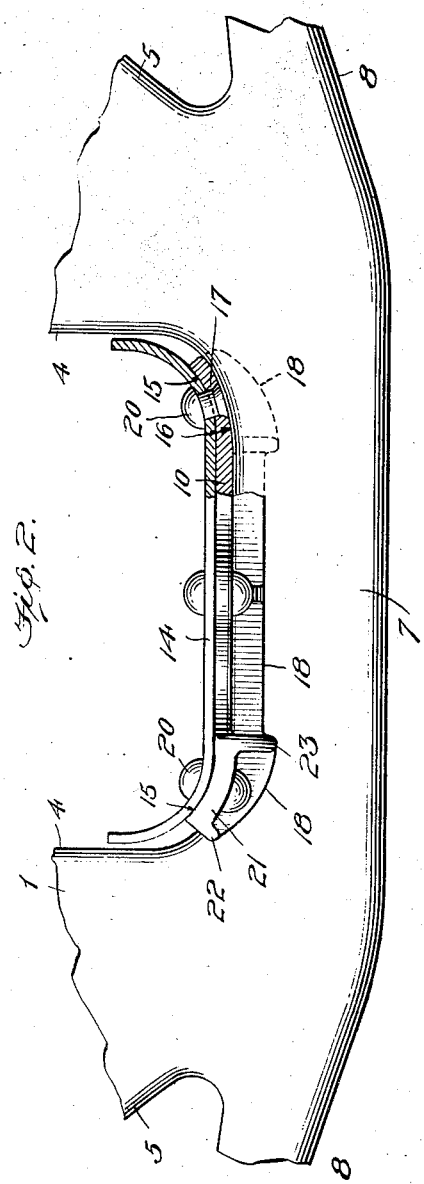
Inventor
Gustaf A. Anderson
By
Attorney

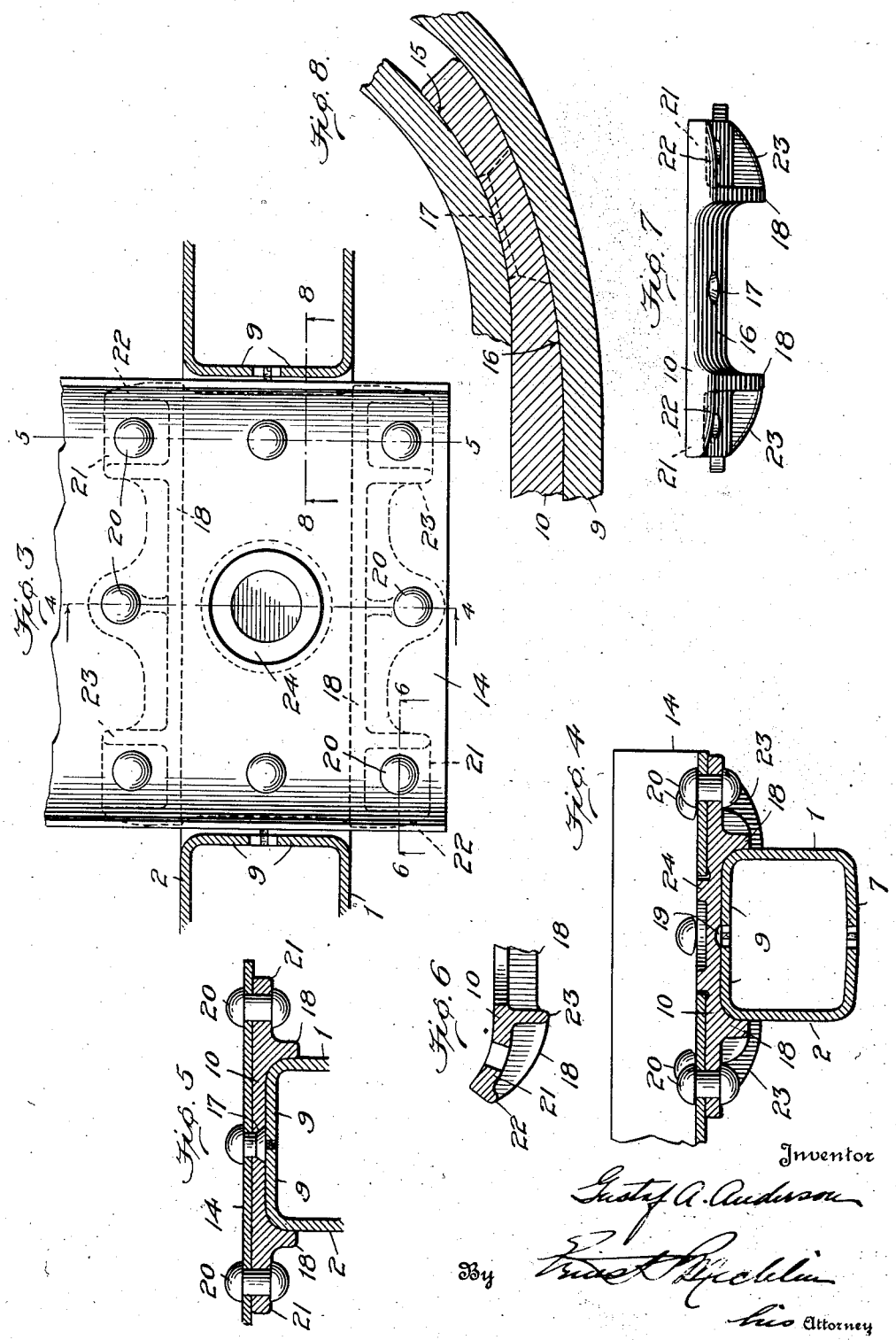

Patented Apr. 5, 1927.

1,623,037

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

CAR-TRUCK SIDE FRAME.

Application filed March 19, 1923. Serial No. 626,108.

My invention relates to side frames for car trucks and has been primarily designed to provide a construction which is both strong and stiff but comparatively light in weight, and in which failures of the frame at the critical points therein are reduced to a minimum.

The invention, generally stated, consists in forming a car truck side frame from a sheet or blank of metal folded and shaped to provide a compression member, tension member and truck columns, said invention forming a continuation in part of my co-pending applications Serial Nos. 595,099 and 595,100, filed October 17, 1922.

One of the principal features of the invention, particularly stated, is to form a car truck side frame from a sheet-metal blank shaped to provide an inner wall and an outer wall disposed in spaced relation to each other, each of said walls having a bolster opening intervening between truck column portions also provided on said walls and integrally connected at their lower ends by a beam portion of the corresponding wall, the said columns and their respective connecting beam portions being provided with stiffening flanges bordering the bolster opening, and the stiffening flanges of each column portion being merged into the stiffening flanges of the said connecting beam portion through a compound curve.

Another object of the invention is to provide a car truck side frame having a bolster opening and truck columns, said truck columns being united at their lower ends by a connecting member whose end portions adjacent the truck columns are increased in cross sectional area, said connecting member being disposed to provide standard clearance between the bottom of the side frame and the rail heads, and also being adapted to receive a spring plank, the seat portion of which is designed to compensate for the increased cross sectional area at the ends of the connecting member and at the same time permit the depth of the bolster opening to be maintained constant.

The invention has for a further object the provision of a spring plank having a seat member or saddle casting, the respective upper and lower end portions of which are differently curved so as to permit the side edges of the spring plank to properly lie between the truck columns, said curved end portions upon the underside of the spring plank seat member permitting an increased depth of the beam member of the side frame connecting the truck columns, said increased depth of the beam member being gradually effected adjacent the lower ends of the truck columns.

A still further object of the invention is to provide a spring plank seat member with thickened portions adjacent the inner and outer side walls of the side frame, said thickened portions being located upon opposite sides and also at the extreme ends of the relatively reduced portions at the ends of said member, said thickened portions being designed to resist strains incident to the squaring action of the truck under service conditions.

Another feature of the invention is to form a spring plank seat portion with a plurality of rivet openings and a pivot stud or boss, the former being utilized when the spring plank is rigidly connected, and the latter being employed when the spring plank is positioned for pivotal movement such as is the case in flexible trucks.

The invention further consists in the combination, arrangement and construction of the several parts to be hereinafter referred to and pointed out in the claims.

In the drawings illustrating an embodiment of my invention as applied to a wrought metal side frame—

Figure 1 is a view in side elevation of a car truck side frame embodying the invention.

Figure 2 is a detail view on a larger scale of the lower portion of the side frame, showing the increased cross sectional area at the ends of the beam member connecting the truck columns and the relative position of the spring plank and its seat portion resting on said beam member, one end of the spring plank and seat portion being shown in section.

Figure 3 is a detail horizontal sectional view through the truck columns of the side frame showing the stiffening flanges projecting inwardly from the side walls, and the spring plank and seat casting extending into the bolster opening and resting upon the beam member connecting the truck columns.

Figure 4 is a transverse sectional view on the line 4—4 of Figure 3.

Figure 5 is a similar view on the line 5—5 of Figure 3.

Figure 6 is a detail longitudinal sectional view on the line 6—6 of Figure 3, through an end portion of the seat casting disposed adjacent one of the side walls of the side frame.

Figure 7 is an end view of the seat casting detached.

Figure 8 is a detail longitudinal sectional view on the line 8—8 of Figure 3, illustrating on an enlarged scale the difference in curvatures of the upper and lower faces of the seat casting.

Referring to the drawings in which corresponding reference characters designate similar parts in the several views, my improved side frame includes an outer wall 1 and an inner wall 2 formed from a continuous sheet or blank of metal suitably shaped, folded and united to provide the compression member 3, truck columns 4, and bottom arch bar 5 continued beneath the bolster opening 6 in the nature of a connecting member or beam 7. Pedestal tie bars 8 may also be provided for connection with the journal boxes shown in dotted lines in Figure 1.

In my present construction of side frame, the sides of the truck column portions adjacent the bolster opening are bordered by stiffening flanges 9 which preferably are continued across the upper portion of the bolster opening. The column stiffening flanges are also designed to merge into connecting flanges which border the lower end of the bolster opening and stiffen the portions of the inner and outer walls by which the lower ends of the truck columns are integrally united. The mergence of the truck column stiffening flanges into the corresponding stiffening flanges at the base of the bolster opening is preferably effected through a compound curving of the flanges at their respective points of junction, the radius of curvature of the portion of the merging curve which is adjacent the stiffening flange at the bottom of the bolster opening being greater than the radius of curvature of the portion of the compound curve adjoining the truck column stiffening flange, as clearly shown in Figure 2. By this means the depth of section of metal is increased at the critical points where the truck columns are united at their lower ends by the beam portion of the side frame beneath the bolster opening. The lower face of the spring plank seat member 10, which rests upon the flanges between the truck columns, is formed with corresponding compound curves at its opposite ends, but the upper face of said seat member at its opposite ends may be otherwise shaped and curved to receive the spring plank, the curvature of which latter may be varied to provide adequate clearance between the side edges of the spring plank and the truck columns. My construction of spring plank seat portion lends itself very well in permitting the metal of the beam portion 7 to be increased in depth and consequent strength value without reducing the clearance between the bottom of the side frame and the top of the rail, the increase of metal at these critical points offering great resistance to the strains incident to service conditions. It will be understood that my particular construction of spring plank and seat casting is capable of use with other types of side frames other than that disclosed wherein it is desirable to obtain increased cross sectional areas at relatively weak portions of the side frame and at the same time maintain a constant depth of bolster opening together with the standard clearance between the bottom of the side frame and the top of the rail.

Bolster guide portions with attached chafing plates 11 may be provided on the truck columns and brake hanger brackets 12 are also shown for supporting the brake hangers 13.

The spring plank seat member 10 is preferably cast and comprises a body portion, the upper surface of which forms a seat for the spring plank 14 and the lower portion of which is adapted to conform to the shape of the upper face of the bottom member uniting the truck column portions of the side frame. Each end of the casting is curved upwardly toward the adjacent truck column portion, said curve beginning at or about the point where the spring of the truck is seated. The upper surface 15 which forms the seat for the spring plank is of a construction in which the radius or radii about which it is struck is designed to provide for the reception of the spring plank and especially its upturned reinforcing flange between the truck columns. The truck columns shown are straight and have their inner faces parallel upon opposite sides of the bolster opening. A curve formed about non-coincident centers or a compound curve may be used to form the spring plank seat portion at the ends of the casting.

The underface of the seat member at each end thereof and beneath the respective upper seat portions 15, is curved as at 16, said curve being struck from a different radius or radii, as the case may be, than those producing the said upper curved seat portion 15, as clearly shown in Fig. 8. Each curved portion 16 provides a comparatively long and gradual curve which permits the metal to be advantageously bent with an increased depth equal to the reduction in thickness of the metal in the seat casting and in practice it is usual to form the seat casting with parallel upper and lower faces. The amount of metal removed, however, from a casting constructed in accordance with my present invention does not materially affect the strength of the casting, the reduced portion being located to one side of that portion of the casting which receives the direct loads through the springs.

In practice I prefer to cast the seat member with the larger lower curved face, but it will be understood that the usual casting may be ground or otherwise cut away to provide for the increased depth of section in the side frame.

A rivet opening 17 may be provided in each end portion of the casting, said opening being formed with a portion to receive a rivet, the head of which is countersunk and the shank of which is riveted over for firmly connecting the spring plank to the seat member. The extreme ends of the seat member are preferably maintained at a relatively normal thickness, as shown in Fig. 8, to provide sufficient support for resisting strains incident to the squaring action of the truck.

Downwardly projecting portions 18 are provided on the casting, said portions being arranged to embrace the neighboring portion of the frame and thus serve to resist any spreading or separation of the walls of the side frame at this point. Separation of the inner and outer walls of the frame adjacent the lower end of the bolster opening may be also provided against by electrically welding the abutting edges of the inturned stiffening flanges upon which the seat member 18 rests, as clearly shown in Figure 4. The underface of the casting may be grooved as at 19 to receive any portion of the weld joint which extends above the joint. The downwardly projecting portions extend longitudinally of the casting and have their inner contacting portions shaped to conform to the adjacent portion of the side frame whereby transverse strains can be effectively imparted to the side frame.

The body portion of the seat member extends beyond the respective side walls of the side frame and provides additional seating area for the spring plank, rivets 20 being provided to rigidly connect the projecting portions of the seat member to the spring plank. Certain of the rivets 20 that unite the spring plank with the respective ends of the seat casting, pass through relatively thickened portions 21 which are reinforced at their outer ends with beads 22, and at their inner ends with depending flanges or ribs 23. The outer curved parts of the downwardly projecting portions 18 are also deeper, as shown in Figure 6, thereby increasing the strength value of the seat member at its ends and upon adjacent opposite sides of the side frame in resisting the forces incident to the squaring action of the truck. Other of the rivets 20 pass through the intermediate extending body portion which is slightly cut back toward the downwardly projecting portion as best shown in Figure 3.

The seat member may be provided with an upstanding annular rib 24 adapted to form a pivot boss for the spring plank which is usually provided with an opening into which the annular rib projects. If the seat member or saddle casting is used on a flexible truck it will be understood that the rivets 20 are omitted and the opposite side frames of the truck permitted to relatively move longitudinally of the truck, the spring plank and pivot boss connection serving as the connecting member between the side frames.

It will be understood that the corner bends provided at the junctions of the truck columns and beam member may be variously formed, that is to say, the increased cross sectional area at these critical points being provided either by a single circular arc, a plurality of circular arcs, a circular arc or arcs and tangent, curves, hyperbolic and parabolic in their nature, and such other combinations of curves and adjacent straight portions as may be found to lend themselves in the reliable manufacture of the side frame and its sustained use under service conditions.

A car truck side frame constructed in accordance with my present invention is comparatively light in weight and of great strength, the material of which it is constructed being of a reliable nature and disposed so that the critical points of strain of the side frame are amply able to sustain the loads and shocks to which they are subjected in service. In addition, a car truck including side frames having bolster openings adapted to receive a spring plank provided with a seat portion of the character described, falls within the A. R. A. standard of measurements with a constant depth of bolster opening and clearance between the underside of the frame and top of the rail.

The method of manufacturing my improved car truck side frame consists in shaping a continuous sheet metal blank having corresponding side frame portions which are symmetrically disposed with respect to an axis of symmetry of the blank passing between them, bending portions of said blank from one side thereof to form flanges, portions of said flanges being gradually deflected from a straight line to form gradual curves of a compound nature, folding the blank along a line at the top of the side frame parallel to the said axis of symmetry of the blank, and finally uniting said flanges. It will be further noted that my improved method involves the production of a wrought metal car truck side frame in which the corner bends uniting the lower portions of the truck columns and the spring plank seat portions are struck from the blank on a curve which produces an increased cross sectional area in the beam member of the side frame at the critical points adjacent the truck columns without changing the usual depth of bolster opening or reducing the clearance beneath the side frame and top of the rail.

What is claimed is:

1. A car truck side frame involving a sheet metal outer wall and a sheet metal inner wall spaced with relation thereto, each of said walls being formed with a bolster opening flanked by truck column portions of said walls, the said truck column portions of each wall being integrally connected at their lower ends by a portion of the corresponding wall, and said bolster openings at the respective junctions of their truck column portions with said connecting portions being in the form of a compound curve.

2. A car truck side frame involving a sheet metal outer wall and a sheet metal inner wall spaced with relation thereto, each of said walls having a bolster opening flanked by a plurality of truck column portions formed from the respective walls and integrally connected at their lower ends by a portion of the corresponding wall, said columns and said connecting portion being respectively provided with stiffening flanges, and the said stiffening flanges of each of said columns being merged into the stiffening flange of said connecting portion through a compound curve.

3. A car truck side frame involving a spring plank seat, a sheet metal outer wall, a sheet metal inner wall spaced with relation to said outer wall, and a sheet metal compression member integrally uniting said walls and adapted to extend over the journal boxes of a car truck, each of said walls having a bolster opening flanked by truck column portions formed from the respective walls and integrally connected at their lower ends by a portion of the corresponding wall, the bolster opening of each wall being in the form of a compound curve at the junctions of said truck columns with the portions of said walls by which the lower ends of said columns are respectively united, and said spring plank seat having a corresponding compound curved face.

4. A car truck comprising a plurality of side frames each having a bolster opening therein, a plurality of spring plank seats respectively carried by said side frames, and a spring plank bearing upon said spring plank seats and extending between said side frames, each of said side frames involving a sheet metal outer wall and a sheet metal inner wall, each of said walls having truck column portions integrally united at their lower ends by a portion of the corresponding wall extending beneath an adjacent one of said spring plank seats, the bolster openings of said side frames being formed with compound curves at the junctions of said column portions with the portions of said walls uniting the lower ends of said columns, the lower side of each of said spring plank seats being formed with corresponding compound curved faces, and said spring plank being formed adjacent said truck columns with compound curved faces.

5. A car truck side frame involving a sheet metal load supporting beam which is integrally united at its ends to upwardly extending sheet metal portions of said frame, said beam being provided with a stiffening flange and said upwardly extending sheet metal portions of the frame being respectively provided with stiffening flanges which merge into the stiffening flange of the said beam through a compound curve.

6. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said truck column portions having their lower end portions curved and adapted to form corner bends with the bottom arch bar portions which extend entirely beneath the said truck column portions.

7. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said bottom arch bar portions having inwardly extending stiffening flanges, said flanges having compound curved portions adapted to form corner bends extending beneath said truck column portions.

8. A car truck side frame involving a continuous sheet metal blank shaped to form an inner wall and an outer wall arranged in spaced relation, each of said walls having a plurality of truck column portions, a plurality of top arch bar portions, and a plurality of bottom arch bar portions; said bottom arch bar portions being provided with flanged portions having compound curved sections therein, said compound curved sections being welded beneath the truck column portions.

9. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; inwardly projecting stiffening flanges provided on said truck column portions having their lower ends extending in a compound curve around the corner bend at the junctions of the truck column portions and spring plank seat portions of the side frame adjacent the bolster opening, and inwardly projecting flanges provided on said bottom arch bar portions and having their lower end portions extending in a compound curve around the corner bend beneath the truck column portions and bolster opening, both of said compound curves at the said respective corner bends providing a maximum cross sectional area of metal at the junctions of the truck column portions and bottom arch bar portions of the side frame.

10. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; inwardly extending stiffening flanges provided on said truck column portions and bottom arch bar portions, said respective flanges extending in compound curves around the corner bends at the junctions of the truck column portions and bottom arch bar portions, and means rigidly uniting said flanges at their corner bends.

11. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions; said truck column portions being provided with inwardly extending flanges, portions of which extend in compound curves around the corner bends at the junction of the truck column portions with the adjacent edge of the bolster opening forming the spring plank seat portion of the side frame, and means uniting said flanges.

12. A car truck side frame involving a sheet metal blank having truck column portions and bottom arch bar portions, the corner bends of said portions at their points of juncture being formed from curves whose centers are non-coincident so as to provide an increased cross sectional area of metal at critical points of the side frame.

13. A car truck side frame involving a continuous sheet metal blank provided with side frame portions, the cross sectional area thereof being determined by oppositely curved boundary edges, said curved edges being struck from relatively closely spaced but non-coincident centers.

14. A car truck side frame involving a sheet metal blank shaped to form inner and outer side walls arranged in spaced relation and provided with a bolster opening, each of said walls having a plurality of truck column portions, a plurality of top arch bar portions, and a plurality of bottom arch bar portions, inwardly projecting stiffening flanges provided on said truck column portions having their lower ends extending around the corner bends at the junction of the truck column portions with the spring plank seat portions of the side frame adjacent the bolster opening, and inwardly projecting flanges provided on said bottom arch bar portions having their lower end portions extending in a curve around the corner bends beneath the truck column portions and bolster opening, both of said curves at the said respective corner bends being formed from radii whose centers are so spaced as to provide a maximum cross sectional area of metal at or near the junctions of the truck column portions and bottom arch bar portions of the side frame.

15. The method of manufacturing car truck side frames which consists in forming the same from a blank of metal having side frame portions, the cross-sectional areas of which portions at the junctions of the truck column portions and bottom arch bar portions are determined by the oppositely curved boundary edges thereof, and cutting portions of said blank along curved lines struck from non-coincident centers.

16. The method of manufacturing car truck side frames which consists in forming the same from a continuous sheet metal blank having corresponding side frame portions which are symmetrically disposed with relation to an axis of symmetry passing between them bending a plurality of flanges from one side of the blank, said flanges having curved portions therein formed from radii whose centers are relatively eccentric, folding the blank along a line at the top of the side frame parallel to said axis of symmetry of the blank, and finally uniting the curved portions of said flanges.

17. A side frame including in combination, a bolster opening and truck columns, a beam member uniting said truck columns at their lower ends, the corner bends at said junctions continued upwardly at increased curvature providing increased cross sectional areas adjacent the truck columns and permitting the depth of the bolster opening to be maintained constant, said increased cross sectional area also being produced without reducing the standard clearance between the bottom of said side frame and the top of the rail.

18. A side frame including in combination, a bolster opening and truck columns, a beam member uniting said truck columns at their lower ends, the corner bends at said junctions being produced by gradually curved portions which permit an increase in depth of the metal for a comparatively long distance at the critical points adjacent said truck columns without reducing the mean depth of bolster opening or decreasing the usual clearance maintained between the bottom of the side frame and top of the rail.

19. In combination, a car truck side frame having a bolster opening and provided at its bottom with a seat portion, the metal of the side frame at the bottom of said bolster opening being of varying cross sectional area, and a spring plank having a portion contacting said seat portion, the depth of the bolster opening being maintained constant and the spring plank seat portion acting to compensate for said varying cross sectional area.

20. In combination, a car truck side frame provided with a bolster opening, the metal of the side frame at the bottom of said bolster opening being of varying cross sectional area, a spring plank extending into said bolster opening, and a seat member for said spring plank, said seat member contacting the side frame at the bottom of the bolster opening and being adapted to compensate for the varying cross sectional area of the metal in the side frame at the bottom of the bolster opening.

21. In combination, a car truck side frame having a bolster opening, a beam member provided on said side frame at the bottom of the bolster opening, said beam member having its end portions adjacent the sides of the bolster opening of increased cross sectional area, by forming the upper edge of said beam member of increasing curvature at its outer ends.

22. In a car truck, the combination with side frame members, of a spring plank connecting said side frame members, and means including a spring plank seat member interposed between each of said side frame members and the adjacent end of the spring plank, said seat member having an upper seating surface adapted to conform to the shape of the spring plank and being provided with a non-parallel bottom seating surface arranged to conform to the contour of the adjacent portion of the side frame member.

23. In a car truck, the combination with oppositely disposed side frame members, of a transversely extending member adapted to connect said side frame members, and means including a saddle member supported on each of the side frame members and adapted to receive said transversely extending member, said saddle member being formed with differently curved upper and lower surfaces.

24. In a car truck, the combination with oppositely disposed side frame members, of a transversely extending member adapted to connect said side frame members, and means including a seat member having a curved portion adapted to receive said transversely extending member, said seat member also being provided with a relatively longer curved portion adapted to contact the side frame, said last named longer curved portion being located beneath the first named curved portion.

25. In combination, a car truck side frame having truck columns and a bolster opening, a spring plank, and a spring plank seat member, said seat member being provided with curved portions adapted to receive the spring plank, and other curved portions arranged to contact the side frame at points adjacent the junction of the truck columns and the portion of the side frame at the bottom of the bolster opening, said last named curved portions being formed from a radius whose center is non-coincident with the center of the radius producing said first named curved portions of the seat member.

26. A car truck side frame including a bolster opening and having truck columns formed integral with the portion of the side frame extending beneath said bolster opening, and a saddle casting having a portion adapted to receive a spring plank, said casting being shaped on its under-face to provide relatively reduced cross sectional areas at points adjacent the juncture of the truck columns and side frame portion beneath the bolster opening, each of said reduced cross sectional areas providing for an increased cross sectional area or depth in the adjacent side frame portions.

27. A car truck side frame including a bolster opening and having spaced inner and outer walls, and a spring plank seat member having depending portions adapted to engage the respective inner and outer walls, said seat member having a central portion engaging the side frame at the bottom of the bolster opening and terminating in curved ends whose upper and lower surfaces are struck from non-coincident centers.

28. A car truck side frame having a bolster opening, and a spring plank seat member provided with a body portion adapted to engage the side frame at the bottom of the bolster opening, said body portion being provided with curved end portions, the upper and lower faces of which are formed about radii having non-coincident centers.

29. A car truck side frame having a bolster opening, and a spring plank seat member provided with a body portion adapted to engage the side frame at the bottom of the bolster opening, said body portion being provided with end portions, the upper faces of which are curved to receive the spring plank between the truck column and the lower faces of which are differently formed to provide a longer curve adapted to conform to the curve uniting said truck columns and portions of the side frame at the bottom of the bolster opening.

30. A spring plank seat member comprising a body portion shaped to engage a side frame and having curved end portions, the upper and lower faces of which are differently curved to provide relatively thin cross sectional areas of metal in said end portions, and relatively thick cross sectional areas of metal at the extreme ends of said curved portions.

31. A spring plank seat member comprising a central body portion provided at each end upon the underface thereof with a curved seat portion formed from radii whose centers are non-coincident.

32. A spring plank seat member comprising a body portion having each end formed with differently curved upper and lower faces, said curved faces permitting a maximum depth of metal in the beam portion of a side frame connecting the truck columns without reducing the effective area of the bolster opening and spring receiving portion.

33. A spring plank seat member comprising a central body portion provided at each end upon its underface with a relatively long and gradual curved seat portion adapted to contact a side frame at the junction of the truck columns with a connecting beam member and having adjacent reinforcing portions at the ends of the member of a relatively large cross sectional depth, said reinforcing portions being located outside of the said central body portion and extending beneath said curved seat portion.

34. A car truck side frame including a bolster opening, and a spring plank seat member having depending portions engaging the outer and inner faces of the side frame at the bottom of said opening, said seat member being formed with relatively reduced cross sectional areas at each end thereof whereby the depth of the metal in said side frame is increased, at the critical points, said depending portions being relatively thickened in cross sectional area at their opposite ends adjacent said reduced cross sectional areas.

35. In combination, a car truck side frame involving a wrought metal sheet arranged to form spaced inner and outer walls and provided with a bolster opening, each of said walls having a plurality of truck column portions, a plurality of top arch bar portions and a plurality of bottom arch bar portions, said truck column portions and bottom arch bar portions being joined at the bottom of the bolster opening in a curve produced from non-coincident centers, and a spring plank seat member provided with curved portions on its underface adapted to conform to at least portions of the curves at the junction of said truck column and bottom arch bar, said seat member having a differently curved upper face for receiving the spring plank with its side edges in spaced relation from the truck column portions.

36. In combination, a car truck side frame involving a wrought metal sheet arranged to form spaced outer and inner walls, stiffening flanges provided on said walls, and a spring plank seat member having depending portions adapted to engage the outer faces of said walls and contact the corner bends at the junction of the stiffening flanges and said walls, said depending portions being disposed throughout the length of said seat member and relatively thickened at their ends to resist strains incident to the forces developed by the truck in squaring.

37. In combination, a car truck side frame provided with a bolster opening and involving spaced inner and outer walls, and a spring plank seat member having downwardly projecting portions adapted to engage said walls at the bottom of the bolster opening, said projecting portions being increased in cross sectional area at their opposite ends adjacent said walls.

38. In combination, a car truck side frame having a spring plank supporting portion, a spring plank seat member having seat portions adjacent the ends thereof, each of said seat portions being adapted to engage said side frame and conforming substantially thereto, said seat portions having relatively thin portions adjacent the ends thereof, and a relatively thick portion between said ends.

39. A spring plank seat member comprising a body portion shaped to engage a side frame and having portions near the respective ends thereof of relatively thin cross sectional area, the intermediate body portion of said seat member between the ends thereof being of relatively thick cross sectional area.

40. The method of manufacturing car truck side frames which consists in forming the same from a continuous sheet metal blank having corresponding side frame portions which are symmetrically disposed with relation to an axis of symmetry passing between them, bending portions from one side of the blank to form flanges, said flanges being compoundly curved adjacent the lower ends of the truck column portions of the side frame and bolster opening therein, folding the blank along a line at the top of the side frame parallel to the axis of symmetry of the blank, and finally welding the compoundly curved portions of said flanges.

41. The method of manufacturing car truck side frames which consists in forming the same from a continuous sheet metal blank having corresponding side frame portions which are symmetrically disposed with relation to an axis of symmetry passing between them, bending a plurality of flanges from one side of the blank, said flanges having compound curved portions therein, folding the blank along a line at the top of the side frame parallel to the said axis of symmetry of the blank, and finally welding the compound curved portions of said flanges.

42. A car truck side frame including a hollow beam portion adapted to unite the lower portions of the truck columns of the side frame, the cross sectional area of the beam portion at and about the junctions of the truck columns therewith being determined by the disposition of continuing boundary edge portions extending upwardly and inwardly of the truck columns adjacent the bolster opening of the side frame.

43. A car truck side frame having a bolster opening, truck columns comprising inner and outer side walls provided with bolster guide portions, a hollow beam portion uniting the lower ends of said truck columns, said beam portion and truck columns at their points of juncture being shaped to form an enlarged bolster opening portion, the marginal edges of the side walls of said enlarged portion providing gradually curved corner bends which are continued upwardly and inwardly of the bolster opening to unite with said bolster guide portions.

44. A car truck side frame, having a bolster opening, hollow truck columns provided with marginal flanges forming bolster guide portions, the marginal flanges adjacent the lower ends of said columns being offset with respect to said guide portions, and a hollow beam member uniting the lower ends of the truck columns, said beam member at the junctions of the truck columns therewith being curved to provide a relatively large corner bend, the upper ends of said curves being continued inwardly of the bolster opening and united with said bolster guide portions.

45. A car truck side frame comprising truck columns and a bottom arch bar portion, said portions joining at the lower ends of said truck columns with the inner corners between the members bounded by curves, the centers of each of which are non-coincident so that increased cross sectional area of metal is provided at critical points of the frame.

46. A car truck side frame comprising truck columns and bottom arch bar portions joining with said truck columns, the junctions between said members being curved at the inner corners thereof, the curvature of said corners being increased toward the outer or upper portions thereof.

47. A car truck side frame comprising truck columns and bottom arch bar portions defining a bolster opening therebetween, the lower portion of said bolster opening being defined by curves which start from the bottom arch bar portion with a relatively small curvature and continue upwardly and outwardly to said truck columns and join therewith at a relatively great curvature.

48. A side frame having a bolster opening, a beam member provided beneath the bolster opening, said beam member having the upper edge of its intermediate portion substantially straight and its end portions constructed adjacent the sides of the bolster opening of increased cross sectional area by forming the same of increasing curvature at its outer ends.

49. A side frame having a bolster opening, truck columns, a beam portion uniting the lower ends of said truck columns, the marginal edges of the side walls of said bolster opening united with the adjacent wall of the beam portion along gradually curved corner bends.

50. A side frame comprising truck columns and a bottom arch bar portion substantially straight along its upper edge for the major portion of its length, said portions joining at the lower ends of the truck columns with the inner corners between the members bounded by continuous curves, the centers of each of which are non-coincident so that increased cross sectional areas of metal are provided at critical points of the frame.

51. A side frame comprising truck columns and bottom arch bar portions joining with said truck columns, the junctions between said members being curved at the inner edges thereof, said curvature being of varying radii for providing increased cross sectional areas of metal at the desired points.

52. A side frame comprising truck columns and a bottom arch bar, the upper side of which is substantially straight for the major portion of its length, said truck columns and arch bar defining a bolster opening therebetween, the lower portion of which is bounded by continuous curves which start from the ends of the straight portion of the bottom arch bar with a relatively small curvature and join with the truck columns at a relatively great curvature.

53. A side frame comprising a compression member, a tension member, bolster guide columns interposed therebetween and spaced to leave a window opening, the tension member, beneath the window opening, having its upper edge substantially straight along its intermediate portion with its end portions constructed, adjacent the sides of a bolster opening, of increasing curvature to provide increased depth for the tension member.

54. A side frame comprising compression, tension and bolster guide members with a bolster opening formed therebetween, that portion of the tension member, beneath the bolster opening, uniting the lower ends of the bolster guide columns, the marginal edges of the side walls of the bolster opening being united with the upper wall of the tension member beneath the bolster opening along gradually curved corner bends.

55. A side frame comprising bolster guide columns and a tension member substantially flat along its upper surface for the major portion of its length between the bolster guide columns, said tension member and columns joining at the lower ends of the latter with the inner corners between the members bounded by continuous curves, the centers of each of which are non-coincident so that increased depth of metal is provided at critical points of the frame.

56. A side frame comprising bolster guide columns and tension portions joining said columns, the junction between said members being curved at the inner edges thereof, said curvature being of varying radii for providing increased depth of metal at desired points.

57. A truck side frame comprising bolster guide columns uniting at their upper ends with a compression member and at their lower ends with a tension member, the upper side of said tension member, between the columns, being substantially straight for the major portion of its length, said columns, compression and tension members defining a bolster opening, the lower portion of which is bounded by continuous curves which start from the ends of the straight portion of the tension member with a relatively small curvature and join with the bolster columns at a relatively large curvature.

In testimony whereof I affix my signature.

GUSTAF A. ANDERSON.